(12) United States Patent  
Takewaki et al.

(10) Patent No.: US 8,734,194 B2  
(45) Date of Patent: May 27, 2014

(54) FUEL SUPPLY SYSTEM OF OUTBOARD MOTOR

(71) Applicant: Suzuki Motor Corporation, Hamamatsu (JP)

(72) Inventors: Hiromichi Takewaki, Hamamatsu (JP); Gen Akutsu, Hamamatsu (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/736,502

(22) Filed: Jan. 8, 2013

(65) Prior Publication Data

US 2013/0178120 A1   Jul. 11, 2013

(30) Foreign Application Priority Data

Jan. 10, 2012   (JP) ................. 2012-002458

(51) Int. Cl.
*F02B 61/04*   (2006.01)

(52) U.S. Cl.
USPC .......................... 440/88 F; 123/516

(58) Field of Classification Search
USPC .......................... 440/88 F; 123/516
See application file for complete search history.

(56) References Cited

U.S. PATENT DOCUMENTS

| | | | |
|---|---|---|---|
| 5,832,903 A * | 11/1998 | White et al. | 123/514 |
| 6,216,672 B1 * | 4/2001 | Mishima et al. | 123/516 |
| 6,428,375 B2 * | 8/2002 | Takayanagi | 440/88 R |
| 6,694,955 B1 * | 2/2004 | Griffiths et al. | 123/516 |
| 7,112,110 B1 * | 9/2006 | Kollmann | 440/88 F |
| 7,431,021 B1 | 10/2008 | Achor | |
| 7,543,573 B2 * | 6/2009 | Olree | 123/518 |
| 2002/0062819 A1 | 5/2002 | Takahashi | |
| 2005/0016504 A1 | 1/2005 | Saito et al. | |

FOREIGN PATENT DOCUMENTS

JP           10-218089 A          8/1998

OTHER PUBLICATIONS

Extended European Search Report, dated May 24, 2013, which issued during the prosecution of European Patent Application No. 13150084.5.

* cited by examiner

*Primary Examiner* — Stephen Avila
(74) *Attorney, Agent, or Firm* — Troutman Sanders LLP

(57) ABSTRACT

A fuel supply system of an outboard motor includes: a vapor separator which separates a fuel sent from a fuel tank by a low-pressure fuel pump into gas and liquid to release fuel vapor to an atmosphere; a fuel cooler which is disposed under the vapor separator to cool the fuel by cooling water passing through a cooling water pipe; a drain pipe connected to a side surface of the fuel cooler which faces downward while the outboard motor is tilted up; and an in-line high-pressure fuel pump connected in a middle of a fuel pipe connected to a side surface of the fuel cooler different from the side surface to which the drain pipe is connected. It is possible to easily and surely draw off the fuel in the fuel pipe while the outboard motor is tilted up.

3 Claims, 5 Drawing Sheets

FUEL SUPPLY SYSTEM OF OUTBOARD MOTOR

CROSS-REFERENCE TO RELATED APPLICATIONS

This application is based upon and claims the benefit of priority of the prior Japanese Patent Application No. 2012-002458, filed on Jan. 10, 2012, the entire contents of which are incorporated herein by reference.

BACKGROUND OF THE INVENTION

1. Field of the Invention

The present invention relates to a fuel supply system of an outboard motor for supplying a fuel stored in a fuel tank to an intake port of an engine.

2. Description of the Related Art

An outboard motor often used in a small craft is generally provided with a fuel supply system for supplying an intake port of an engine of the outboard motor with a fuel stored in a fuel tank provided on a hull side.

In this fuel supply system, a vapor separator for separating the fuel such as gasoline sucked up from the fuel tank by a low-pressure fuel pump into gas and liquid to release fuel vapor into the atmosphere, a fuel cooler for cooling the fuel having passed through the vapor separator by cooling water (seawater), a high-pressure fuel pump for pumping the fuel having passed through the fuel cooler, a pressure regulator for adjusting pressure of the fuel, an injector for injecting the fuel whose pressure has been adjusted by the pressure regulator to the intake port of the engine, and so on are generally provided.

As a conventional fuel supply system of this type, for example, one in which a high-pressure fuel pump and a pressure regulator are integrally provided in a case of a vapor separator and a water jacket (fuel cooler) for cooling the fuel is also provided in the case of the vapor separator, whereby the piping of a fuel system is simplified (for example, refer to Patent Document 1), and the like are publicly known.

[Patent Document 1] Japanese Laid-open Patent Publication No. 10-218089

However, in the above-described conventional fuel supply system, since the vapor separator and the high-pressure fuel pump are integrally provided, the size of the vapor separator becomes large for an outboard motor, which has a problem of difficulty in making the outboard motor compact.

Therefore, to solve this problem, there has also been proposed a fuel supply system using what is called an in-line high-pressure fuel pump connected in the middle of a fuel pipe. However, the fuel supply system of this type has a problem that it is difficult to completely draw off a fuel in the fuel pipe or the like between a vapor separator and the high-pressure fuel pump at the time of tilt-up and this work takes a lot of trouble.

SUMMARY OF THE INVENTION

The present invention was made to solve the above-described problems and has an object to provide a fuel supply system of an outboard motor which enables a fuel in a fuel pipe or the like to be easily and surely drawn off while an outboard motor is tilted up and is capable of realizing compactness.

To attain the above object, the present invention is a fuel supply system of an outboard motor for supplying a fuel stored in a fuel tank to an intake port of an engine, the fuel supply system including: a vapor separator which separates the fuel sent from the fuel tank by a low-pressure fuel pump into gas and liquid to release fuel vapor to an atmosphere; a fuel cooler which is disposed under the vapor separator to cool the fuel by cooling water passing through a cooling water pipe; a drain pipe connected to a side surface of the fuel cooler which faces downward while the outboard motor is tilted up; and an in-line high-pressure fuel pump connected in a middle of a fuel pipe connected to a side surface of the fuel cooler different from the side surface to which the drain pipe is connected.

According to this feature, since the drain pipe is connected to the side surface of the fuel cooler which faces downward while the outboard motor is tilted up, it is possible to surely and easily draw off the fuel in the fuel supply system, enabling an improvement in maintenability. Further, providing the drain pipe on the fuel cooler makes it possible to make the fuel supply system compact, enabling the downsizing of the outboard motor. Further, disposing the fuel cooler under the vapor separator enables an extension distance of the cooling water pipe to be the shortest, which can enhance cooling efficiency of the fuel and simplify an assembly work.

Further, the fuel supply system of the outboard motor according to the present invention may be characterized in that a fuel pipe extending from the vapor separator is connected to an upper surface of the fuel cooler, the drain pipe is connected to a front surface of the fuel cooler, and the fuel pipe extending toward the high-pressure fuel pump is connected to a rear surface of the fuel cooler.

According to this feature, it is possible to more surely and more easily draw off the fuel in the fuel supply system, enabling a further improvement in maintenability.

Further, the fuel supply system of the outboard motor according to the present invention may be characterized in that a periphery of the engine is covered by an engine cover, the engine cover is vertically divided into an upper cover and a lower cover, the fuel cooler is covered by the lower cover, an operation part of a valve for opening/closing the drain pipe is provided on an upper surface of the fuel cooler, and when the upper cover is opened to open an upper opening portion of the lower cover, a maintenance space is formed from the upper opening portion up to the operation part.

According to this feature, it is possible to easily operate the operation part of the valve by inserting a tool such as a socket wrench or a driver into this maintenance space from the upper opening portion, without detaching the lower cover, which enables a further improvement in maintenability.

DETAILED DESCRIPTION OF THE PREFERRED EMBODIMENTS

Hereinafter, an embodiment of the present invention will be described with reference to the drawings. Note that in the following description, front, rear, left, and right directions are based on a travelling direction of a hull.

Figure 1:
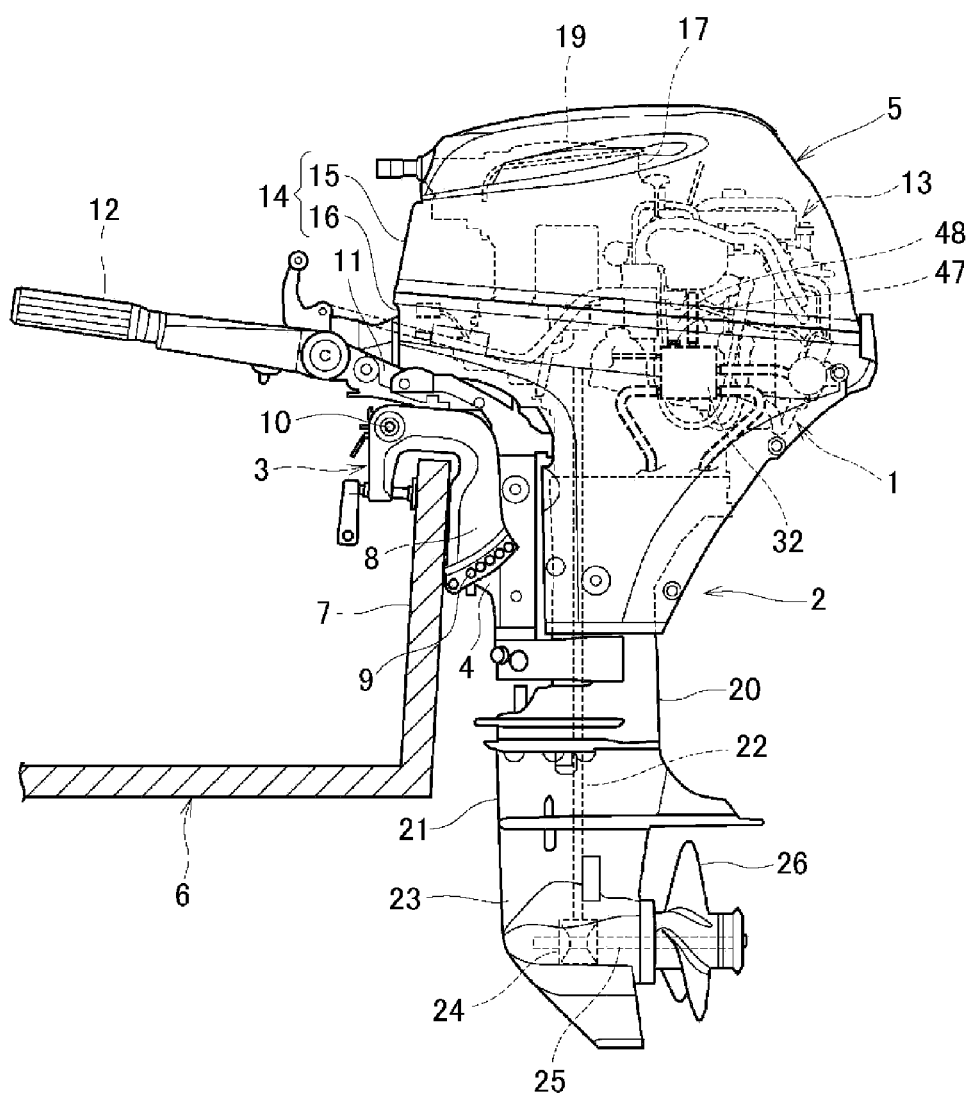
FIG. 1 is a left side view showing an outboard motor including a fuel supply system according to an embodiment of the present invention.

FIG. 1 is a left side view showing an outboard motor 2 including a fuel supply system 1 according to the embodiment of the present invention. The outboard motor 2 is mainly composed of a pair of left and right clamp brackets 3, a swivel bracket 4 provided to be tiltable in an up and down direction relatively to the clamp brackets 3, and an outboard motor body 5 held by the swivel bracket 4.

The clamp brackets 3 are each fixed to the hull 6 so as to sandwich an upper end of a stern board 7, and on lower ends thereof, leg portions 8 are formed in parallel so as to face each other. A plurality of pin holes 9 are bored in each of the leg portions 8, and in a side view, the pin holes 9 are arranged in a substantially arc shape with respect to a tilt shaft 10.

The swivel bracket 4 is disposed so as to be fitted between the clamp brackets 3. An upper portion of the swivel bracket 4 is pivotally supported on upper portions of the clamp brackets 3 via the tilt shaft 10, thereby capable of tilting in the up and down direction. On a rear portion of the swivel bracket 4, a pivot shaft (not shown) is pivotably provided, and this pivot shaft is coupled to the outboard motor body 5. An upper end portion of the pivot shaft projects forward to form a steering bracket 11, and a steering handle 12 is pivotally attached to the steering bracket 11.

An engine 13 is installed in an upper portion of the outboard motor body 5, and its periphery is covered by an engine cover 14. The engine cover 14 is vertically dividable into an upper cover 15 and a lower cover 16. The upper cover 15 covers an upper portion of the engine 13 and the lower cover 16 covers a lower portion of the engine 13.

In the engine 13, a crankshaft (not shown) is provided in a substantially vertical direction. A recoil 17 is provided on an upper end portion of the crankshaft, and a manual starter rope (not shown) is wound around the recoil 17. Further, an area above the recoil 17 is covered by a recoil cover 19.

Under the engine cover 14 across an oil pan 20, a drive shaft housing 21 is provided. In the oil pan 20 and the drive shaft housing 21, a drive shaft 22 coupled to a lower end of the crankshaft extends downward. The drive shaft 22 drives a propeller 26 via a bevel gear 24 and a propeller shaft 25 in a gear case 23 provided on a lower portion of the drive shaft housing 21.

Figure 2:
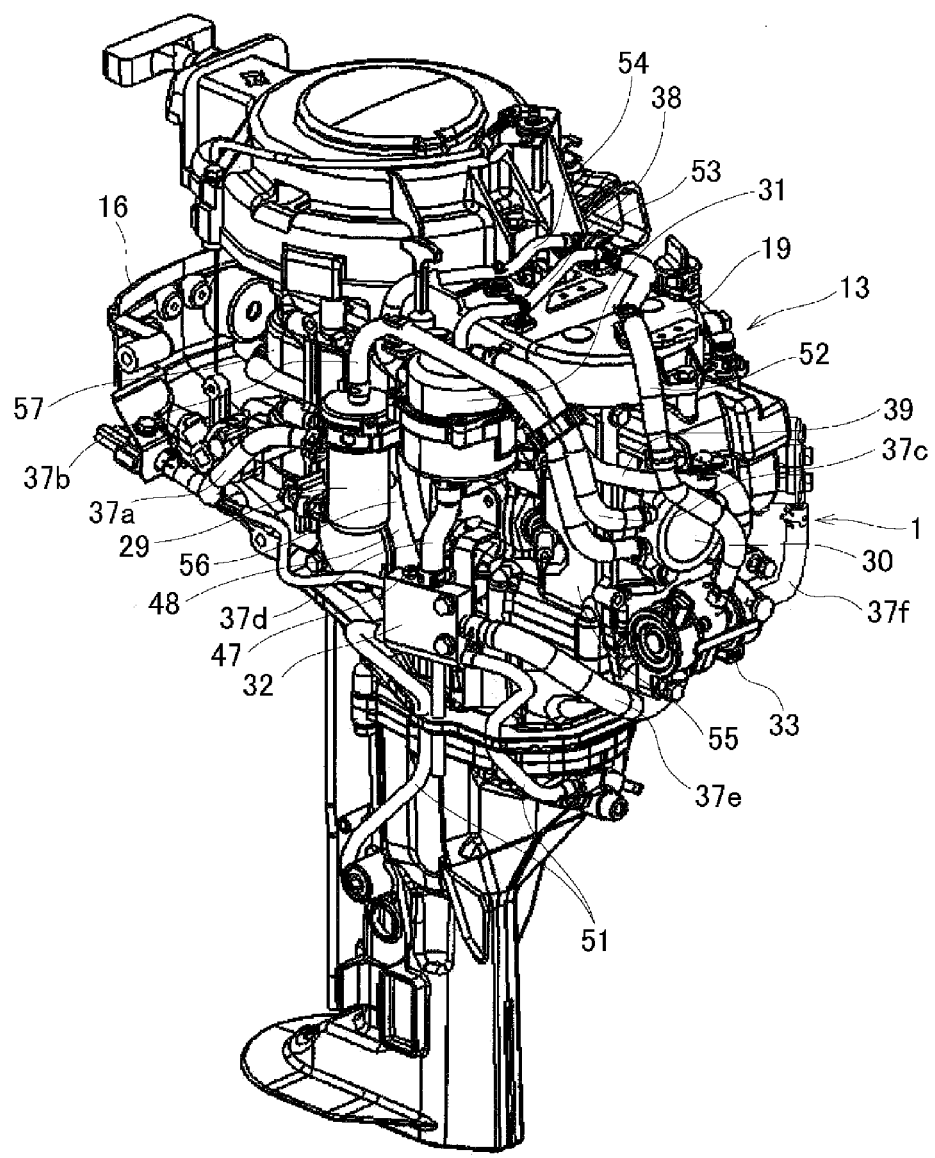
FIG. 2 is a perspective view showing an engine including the fuel supply system according to the embodiment of the present invention.
Figure 3:
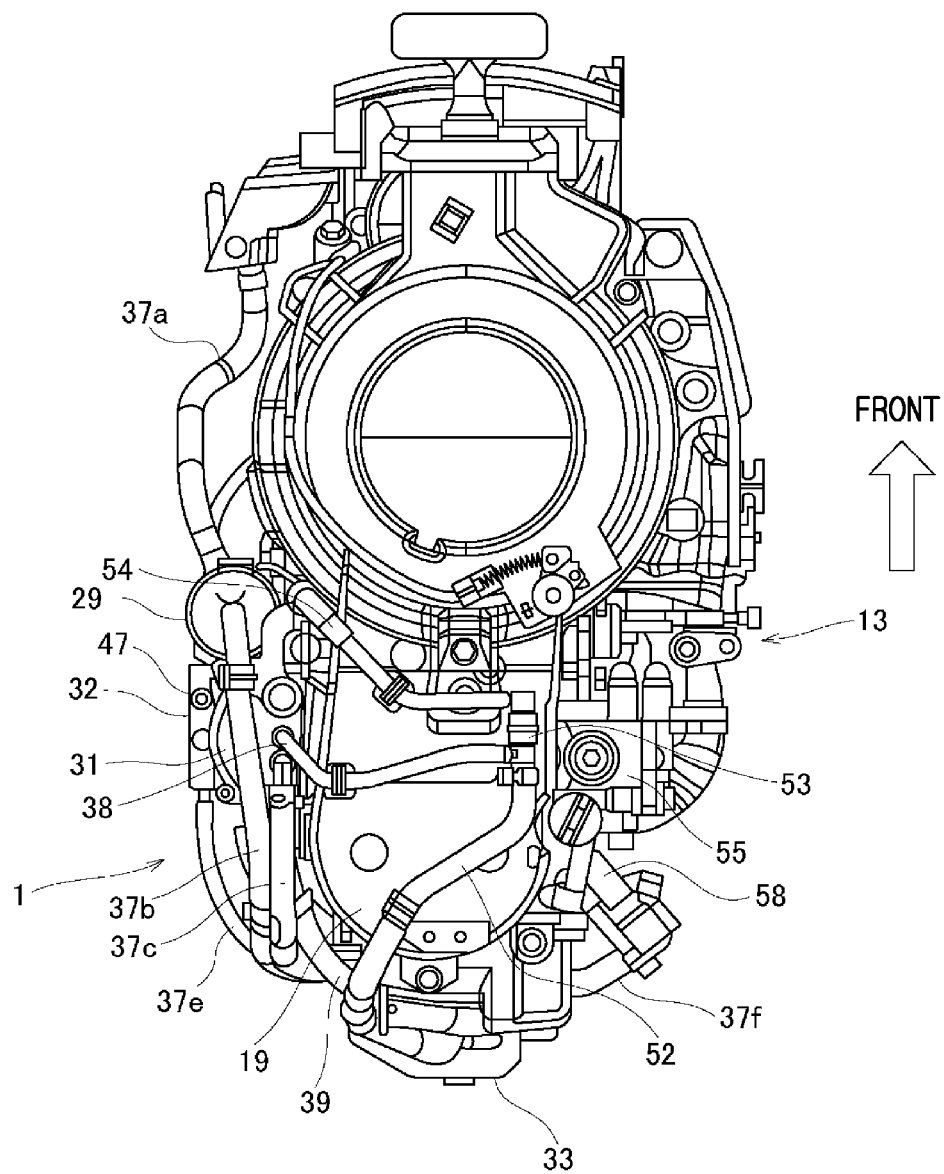
FIG. 3 is a plane view showing the engine including the fuel supply system according to the embodiment of the present invention.
Figure 4:
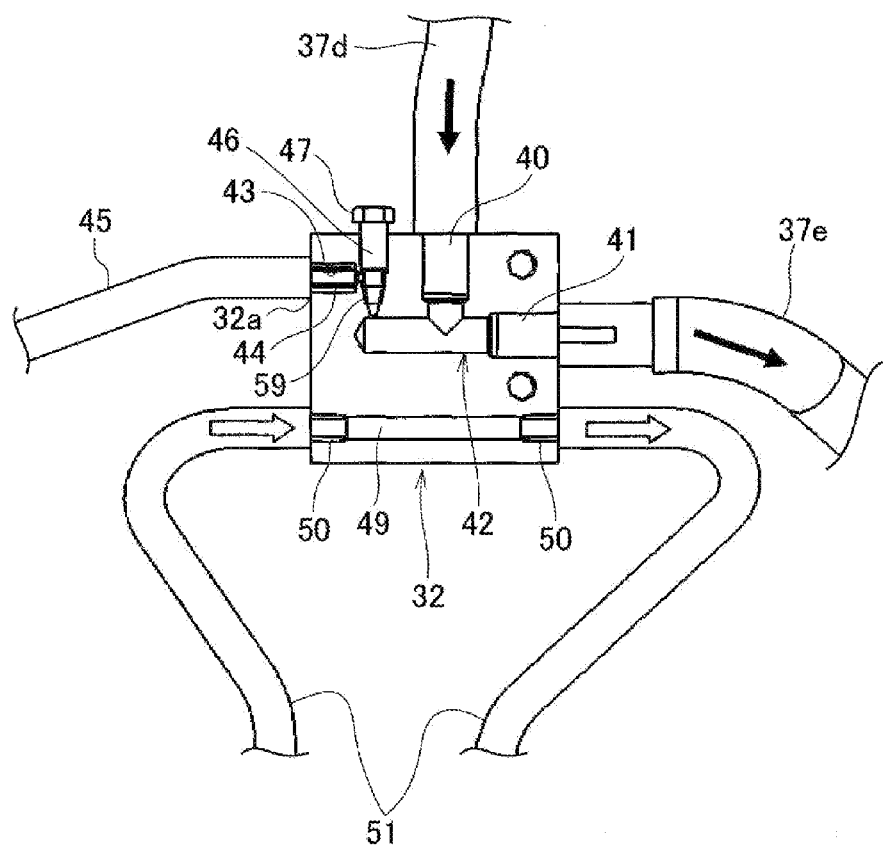
FIG. 4 is a cross-sectional view showing a fuel cooler of the fuel supply system according to the embodiment of the present invention.

Hereinafter, the fuel supply system 1 according to the embodiment of the present invention will be described in detail with reference to FIG. 1 to FIG. 4. Here, FIG. 2 is a perspective view showing the engine including the fuel supply system 1 according to the embodiment of the present invention. FIG. 3 is a plane view showing the engine including the fuel supply system 1 according to the embodiment of the present invention. FIG. 4 is a cross-sectional view showing a fuel cooler 32 of the fuel supply system 1 according to the embodiment of the present invention.

As shown in FIG. 2 and FIG. 3, the engine 13 is, for example, a water-cooled cycle four-cylinder engine, and is composed of the combination of a cylinder head 55, a cylinder block 56, a crankcase 57, and so on. In the cylinder head 55, an intake port and an exhaust port (neither is shown) connecting to a combustion chamber are formed. Further, an injector 58 which injects a fuel into the intake port is attached to the cylinder head 55 from the outside.

Around the engine 13, the fuel supply system 1 is disposed. The fuel supply system 1 is a system to supply the intake port of the engine 13 with the fuel such as gasoline stored in a fuel tank (not shown) provided on the hull 6 side. The fuel supply system 1 is composed of components such as a low-pressure fuel filter 29, a low-pressure fuel pump 30, a vapor separator 31, the fuel cooler 32, a high-pressure fuel pump (in-line high-pressure fuel pump) 33, a pressure regulator and a high-pressure fuel filter (neither is shown) which are provided in the high-pressure fuel pump 33, the injector 58, and so on, these components being provided from the fuel tank side toward the intake port.

The low-pressure fuel filter 29 has a substantially columnar outer shape and is disposed at a substantially center portion of an upper left side of the outboard motor 5. A fuel pipe 37a extending from the fuel tank is connected to a front surface of the low-pressure fuel filter 29. The fuel pipe 37a is formed so as to tilt up from a forward direction toward the low-pressure fuel filter 29 provided at the rear thereof. Further, a fuel pipe 37b extending toward the low-pressure fuel pump 30 is connected to an upper surface of the low-pressure fuel filter 29. The fuel pipe 37b is formed so as to tilt down toward the low-pressure fuel pump 30 provided at the rear thereof after rising substantially vertically.

The low-pressure fuel pump 30 has a flat columnar outer shape and is disposed at a substantially center portion of an upper rear of the outboard motor body 5. The fuel pipe 37b extending from the low-pressure fuel filter 29 is connected to a left side surface of the low-pressure fuel pump 30. Further, above the fuel pipe 37b on the left side surface of the low-pressure fuel pump 30, a fuel pipe 37c extending toward the vapor separator 31 is disposed so that the fuel pipe 37c and the fuel pipe 37b extending from the low-pressure fuel filter 29 are arranged left and right.

The vapor separator 31 has a substantially columnar outer shape, and is disposed on a rear right of and slightly above the low pressure fuel filter 29 so as to be close to the low-pressure fuel filter 29. To an upper surface of the vapor separator 31, the fuel pipe 37c extending from the low-pressure fuel pump 30 is connected and a vapor vent pipe 38 of the vapor separator 31 is also connected in front of the fuel pipe 37c. The vapor vent pipe 38 extends above the recoil cover 19. Further, a fuel return pipe 39 extending from the high-pressure fuel pump 33 is connected to a rear surface of the vapor separator 31. Further, a fuel pipe 37d extending to the fuel cooler 32 is connected to a lower surface of the vapor separator 31.

The fuel cooler 32 has a flat rectangular parallelepiped outer shape and is disposed under the vapor separator 31. As shown in FIG. 4 well, inside the fuel cooler 32, a fuel path 42 composed of a vertical hole 40 bored from its upper surface and a horizontal hole 41 bored from its rear surface is formed in an inverse T-shape. The fuel pipe 37d extending from the vapor separator 31 is connected to the vertical hole 40 via the upper surface of the fuel cooler 32. A fuel pipe 37e extending toward the high-pressure fuel pump 33 is connected to the horizontal hole 41 via the rear surface of the fuel cooler 32 which is located upward while the outboard motor 2 is tilted up. The fuel pipe 37e is formed so as to tilt down from a forward direction toward the high-pressure fuel pump 33 provided at the rear thereof.

Further, inside the fuel cooler 32, a drain hole 43 is bored to extend rearward from an upper portion of a front surface 32a which is located down while the outboard motor 2 is tilted up. A drain pipe 45 is connected to the drain hole 43 via a union joint 44. The drain hole 43 is formed so as to be capable of communicating with the fuel path 42. In a communication part 59 between the drain hole 43 and the fuel path 42, a lower end portion of a valve 46 is inserted. On the upper surface of the fuel cooler 32, an operation part 47 of the valve 46 is projectingly provided. When the upper cover 15 is opened to open the upper opening portion of the lower cover 16, a maintenance space 48 (refer to FIG. 1, FIG. 2, and FIG. 5) reaching the upper opening portion of the lower cover 16 is formed above the operation part 47. Accordingly, by inserting a tool such as a socket or a driver into the maintenance space 48 from the upper opening portion of the lower cover 16 and operating the operation part 47 to rotate it, it is possible to open/close the communication part 59 between the drain hole 43 and the fuel path 42.

Further, inside the fuel cooler 32, a cooling water path 49 is penetratingly provided linearly from its front surface lower portion toward its rear surface lower portion, and cooling water pipes 51 are connected to a front inlet and a rear outlet of the cooling water path 49 via union joints 50 respectively.

Referring to FIG. 2 and FIG. 3 again, the high-pressure fuel pump 33 is what is called an in-line fuel pump connected in the middle of the fuel pipe to be used and is disposed under and close to the low-pressure fuel pump 30. The fuel pipe 37e extending from the fuel cooler 32 is connected to a lower side of the high-pressure fuel pump 33. The fuel return pipe 39 is connected to an upper side of the high-pressure fuel pump 33. The fuel return pipe 39 is connected to the rear surface of the vapor separator 31.

Further, an air vent pipe 52 is connected to the upper side of the high-pressure fuel pump 33 so as to be adjacent to the fuel return pipe 39. The air vent pipe 52 extends upward to join the vapor vent pipe 38 of the vapor separator 31 above the recoil cover 19. A 3-way union joint 53 is provided on a joining portion therebetween and a vapor release pipe 54 is connected to the union joint 53.

Further, a fuel pipe 37f extending toward the injector 58 is connected to a right side surface of the high-pressure fuel pump 33. The fuel pipe 37f is formed to extend upward.

Next, the operation of the fuel supply system 1 according to the embodiment of the present invention will be described.

The fuel in the fuel tank is sucked up by the low-pressure fuel pump 30, is filtrated by the low-pressure fuel filter 29, and thereafter passes through the fuel pipe 37c to be led to the inside of the vapor separator 31 from the upper surface of the vapor separator 31.

Inside the vapor separator 31, the fuel is separated into gas and liquid, and fuel vapor is released to the atmosphere through the vapor vent pipe 38 and the vapor release pipe 54, and the liquid of the fuel from which the vapor has been removed passes through the fuel pipe 37d to flow into the fuel cooler 32.

In the fuel cooler 32, heat exchange takes place between seawater circulating in the cooling water pipes 51 and the liquid fuel, so that the liquid fuel is cooled, and the liquid fuel is sent to the high-pressure fuel pump 33 through the fuel pipe 37e.

Thereafter, the liquid fuel is pumped by the high-pressure fuel pump 33, and after being adjusted in pressure by the pressure regulator and filtrated by the high-pressure fuel filter, the liquid fuel passes through the fuel pipe 37f to be sent to the injector 58, and the fuel is sprayed into the intake port by the injector 58.

Figure 5:
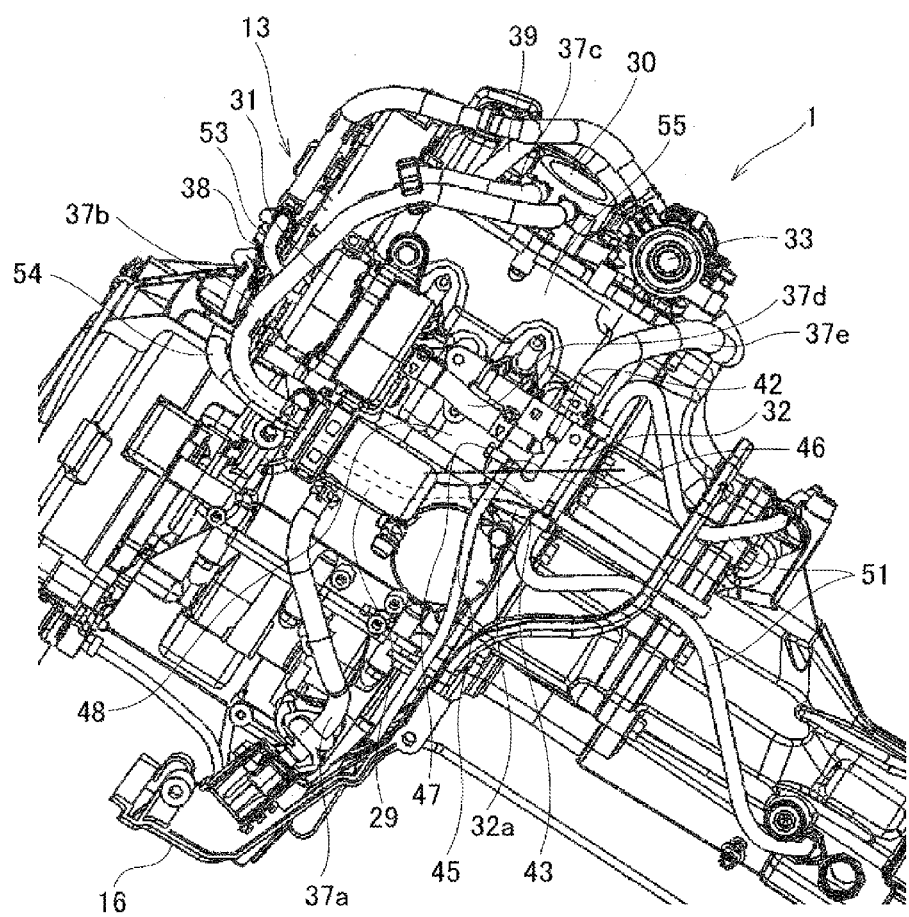
FIG. 5 is a left side view showing a state when the outboard motor including the fuel supply system according to the embodiment of the present invention is tilted up.

The outboard motor 2 including the above-described fuel supply system 1 is tilted up during mooring or the like. FIG. 5 is a left side view showing a state when the outboard motor 2 including the fuel supply system 1 according to the embodiment of the present invention is tilted up. As shown in FIG. 5, when the outboard motor 2 is tilted up, the fuel cooler 32 is located in a lower portion of the fuel supply system 1 and the front surface 32a of the fuel cooler 32 to which the drain pipe 45 is connected faces down. Therefore, by operating the operation part 47 of the valve 46 to rotate it so as to open the communication part 59 between the drain hole 43 and the fuel path 42, it is possible to surely and easily draw off the fuel in the fuel supply system 1 while the outboard motor 2 is tilted up, which enables an improvement in maintenability.

Further, at this time, since the maintenance space 48 reaching the upper opening portion of the lower cover 16 is formed above the operation part 47 of the valve 46, it is possible to easily perform the rotation operation of the operation part 47 of the valve 46 by inserting a tool such as a socket wrench or a driver into the maintenance space 48 from the upper opening portion, without detaching the lower cover 16.

Further, as described above, as a drain mechanism of the fuel, the drain pipe 45, the valve 46, and its operation part 47 are provided on the fuel cooler 32, which realizes compactness of the fuel supply system 1, enabling the downsizing of the outboard motor 2.

Further, by disposing the fuel cooler 32 on the lowest portion of the engine 13 as described above, it is possible to make an extension distance of the cooling water pipes 51 the shortest, which can enhance cooling efficiency of the fuel and realize the simplification of an assembly work.

It should be noted that in the description of the foregoing embodiment of the present invention, only a suitable embodiment of the fuel supply system of the outboard motor according to the present invention is described, and therefore, though various technically preferable limitations are sometimes set forth, the technical scope of the present invention is not limited to these forms unless there is a description particularly limiting the present invention. That is, the constituent elements in the above-described embodiment of the present invention can be appropriately replaced by existing constituent elements and the like, and various variations including the combination with other existing constituent elements are possible, and the description of the above embodiment of the present invention does not limit the contents of the inventions described in the claims.

According to the present invention, it is possible to obtain various excellent effects such as that a fuel in a fuel pipe can be easily and surely drawn off while an outboard motor is tilted up, that compactness can be achieved, and so on.

What is claimed is:

1. A fuel supply system of an outboard motor for supplying a fuel stored in a fuel tank to an intake port of an engine, the fuel supply system comprising:
    a vapor separator which separates the fuel sent from the fuel tank by a low-pressure fuel pump into gas and liquid to release fuel vapor to an atmosphere;
    a fuel cooler which is disposed under the vapor separator to cool the fuel by cooling water passing through a cooling water pipe;
    a drain pipe connected to a side surface of the fuel cooler which faces downward while the outboard motor is tilted up; and
    an in-line high-pressure fuel pump connected in a middle of a fuel pipe connected to a side surface of the fuel cooler different from the side surface to which the drain pipe is connected.

2. The fuel supply system of the outboard motor according to claim 1, wherein a fuel pipe extending from the vapor separator is connected to an upper surface of the fuel cooler, the drain pipe is connected to a front surface of the fuel cooler, and the fuel pipe extending toward the high-pressure fuel pump is connected to a rear surface of the fuel cooler.

3. The fuel supply system of the outboard motor according to claim 1, wherein a periphery of the engine is covered by an engine cover, the engine cover is vertically divided into an upper cover and a lower cover, the fuel cooler is covered by the lower cover, an operation part of a valve for opening/closing the drain pipe is provided on an upper surface of the fuel cooler, and when the upper cover is opened to open an upper opening portion of the lower cover, a maintenance space is formed from the upper opening portion up to the operation part.

* * * * *